United States Patent
Morrish

(10) Patent No.: US 7,042,518 B1
(45) Date of Patent: May 9, 2006

(54) DIGITALLY CONTROLLED VARIABLE FREQUENCY HF EMPHASIS CIRCUIT FOR USE IN VIDEO DISPLAYS

(75) Inventor: Andrew J. Morrish, Saratoga, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 573 days.

(21) Appl. No.: 10/135,902

(22) Filed: Apr. 29, 2002

(51) Int. Cl.
*H04N 5/213* (2006.01)

(52) U.S. Cl. ............................. 348/625; 345/660
(58) Field of Classification Search ............... 348/625, 348/607, 613, 611, 687, 678, 627, 614, 622, 348/470; 345/660
See application file for complete search history.

(56) References Cited

U.S. PATENT DOCUMENTS

| | | | | |
|---|---|---|---|---|
| 3,622,692 A * | 11/1971 | Stephens, Jr. | ............... | 348/490 |
| 4,597,021 A * | 6/1986 | Yamamitsu et al. | ............ | 386/9 |
| 4,757,390 A * | 7/1988 | Mehrgardt et al. | ............ | 386/34 |
| 5,126,846 A * | 6/1992 | Niimura | ...................... | 348/613 |
| 5,298,981 A * | 3/1994 | Topper et al. | ............... | 348/630 |
| 5,299,002 A * | 3/1994 | Funayama | .................. | 348/607 |
| 5,299,003 A * | 3/1994 | Ochi et al. | .................. | 348/607 |
| 5,317,240 A * | 5/1994 | Keller | ......................... | 315/383 |
| 5,381,107 A * | 1/1995 | Hamamoto | .................. | 327/306 |
| 5,486,874 A * | 1/1996 | Songer | ........................ | 348/600 |
| 5,543,974 A * | 8/1996 | Sugita | ......................... | 386/113 |
| 5,598,225 A * | 1/1997 | Songer | ........................ | 348/606 |
| 5,757,436 A * | 5/1998 | Songer | ........................ | 348/470 |
| 5,771,333 A * | 6/1998 | Hirayama et al. | ............ | 386/85 |
| 5,844,619 A * | 12/1998 | Songer | ........................ | 348/447 |
| 6,166,579 A * | 12/2000 | Hojabri et al. | .............. | 327/308 |
| 6,407,747 B1 * | 6/2002 | Chui et al. | ................... | 345/660 |
| 6,411,305 B1 * | 6/2002 | Chui | .......................... | 345/660 |
| 6,670,796 B1 * | 12/2003 | Mori | .......................... | 323/282 |

* cited by examiner

*Primary Examiner*—Paulos M. Natnael
(74) *Attorney, Agent, or Firm*—Merchant & Gould P.C.; Mark R. Hennings

(57) ABSTRACT

A sharpness filter processes a video signal that is to be displayed in a windowed environment. The windowed environment may contain windows that for displaying television images derived from video standards such as NTSC, PAL, and SECAM. Displaying windowed television images results in line scan rates and spatial frequencies that differ from the line scan rate and spatial frequency specified by the original video standard. The sharpness filter of the invention emphasizes certain high frequency components of the video signal in accordance with the encountered spatial frequencies. A control circuit for the sharpness filter provides a linear correlation between a user control and the center frequency of the sharpness filter. The sharpness filter shapes the output signal to avoid saturation and overdriving of video input amplifiers. The circuit can be implemented using a low-cost CMOS process.

20 Claims, 5 Drawing Sheets

DIGITALLY CONTROLLED VARIABLE FREQUENCY HF EMPHASIS CIRCUIT FOR USE IN VIDEO DISPLAYS

BACKGROUND OF THE INVENTION

Since the earliest days of television, people have desired better quality in the video images displayed by televisions. Signal processing techniques are used to enhance the perceived quality of the video images displayed by televisions. One such technique is high frequency compensation, which is used to make video images to appear sharper. For certain legacy video standards (such as NTSC, PAL, and SECAM), a high frequency boosting circuit is used to boost frequencies that are higher than a certain limit ("boost frequency limit"). The boost frequency limit is often chosen to be a frequency around that of the chrominance carrier, which is around 3 MHz for NTSC signals. Typical high frequency emphasis circuits for such video standards use a simple first order differentiator circuit to emphasize certain portions of a video signal. The emphasized portions of the video signal typically lie in the portion of the signal that contains frequencies that are higher than the boost frequency limit.

SUMMARY OF THE INVENTION

The present invention relates to a method and apparatus for enhancing a video image. More specifically, the present invention is directed to a sharpness filter that selectively increases the sharpness of a video signal by performing high frequency compensation upon the video signal.

Briefly stated, a digitally controlled variable frequency circuit and method are disclosed for enhancing high frequency content in a video signal. The sharpness filter includes a first high pass filter, and inverter, a second high pass filter, and a summer. The sharpness filter has a first RC time constant and is configured to produce a high pass filtered video signal in response to the video signal. The inverter is configured to produce an inverted video signal such that the inverted video signal has an opposing polarity to the video signal. A second high pass filter has a second RC time constant and is configured to produce a high pass filtered inverted video signal in response to the inverted video signal. The summer is configured to combine the high pass filtered video signal and the high pass filtered inverted video signal to produce a video signal having enhanced high frequency content.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE PREFERRED EMBODIMENT

Figure 1:
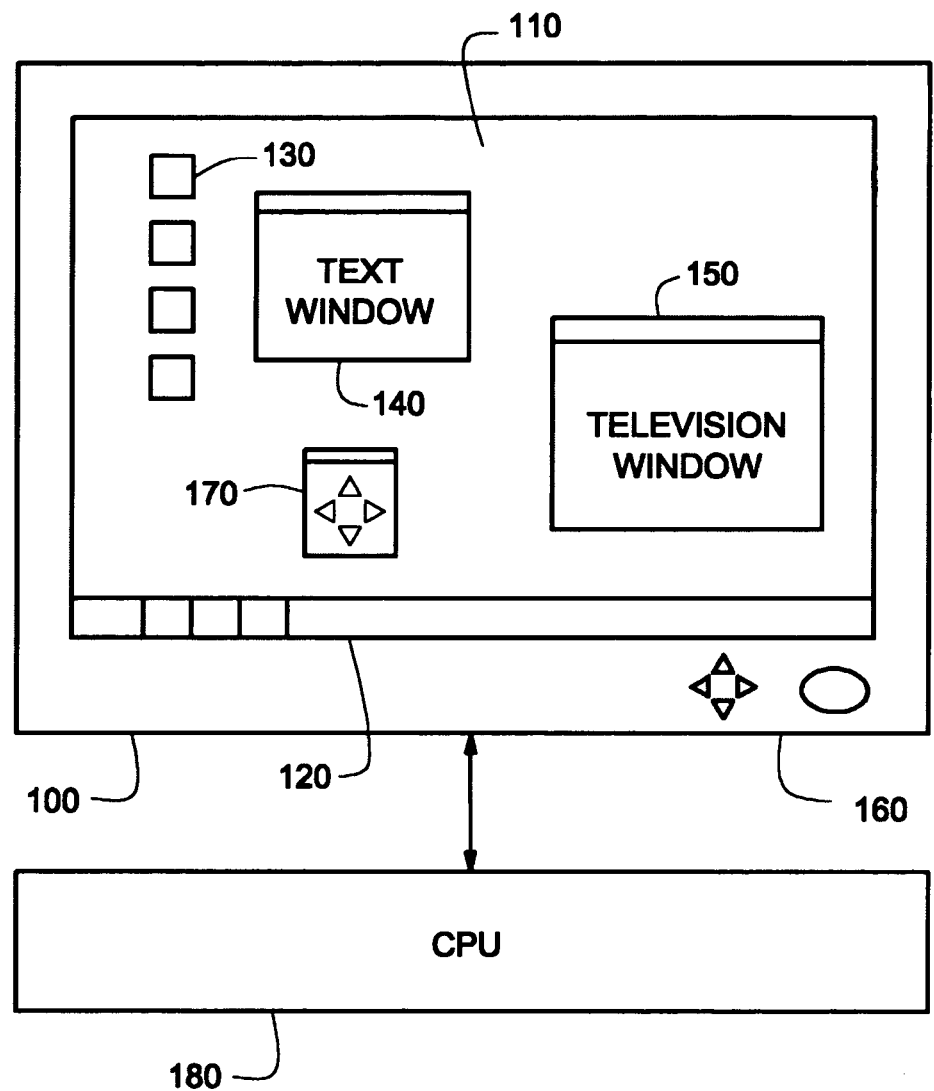
FIG. 1 shows an example user interface and display of a desktop windowed environment for controlling and displaying video images in accordance with the present invention.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

The present invention is directed to a method and apparatus that provides a sharpness filter for processing a video signal that is to be displayed in a windowed environment. The windowed environment may contain windows that are arranged to display television images that are derived from video standards such as NTSC, PAL, and SECAM. Each video standard has a specified scan rate and spatial frequency that are required for proper image display. In order to display windowed television images, the line scan rates and spatial frequencies of the television images must be modified from the original video standard requirements. The sharpness filter of the present invention is arranged to emphasize selected high frequency components of the video signal to increase the perceived sharpness of a displayed image of the video signal. A control circuit is arranged to adjust various settings for the sharpness filter such that there is a linear correlation between a user control and the center frequency of the sharpness filter.

Television video signals are transmitted with a main carrier frequency of nominally 1.25 MHz. The transmitted video signal includes a chrominance subcarrier (fchroma) that is arranged to carry modulated color difference signals that allow the color information of the image to be transmitted. The horizontal scan frequency (i.e., "horizontal scan rate") that is required to display a video signal is determined by the number of scan lines per frame, and the number of times the frame is refreshed per second (i.e., the "vertical scan rate"). A typical chrominance subcarrier is approximately 3.6 MHz with a horizontal scan rate of 16 kHz, and a vertical scan rate of 60 Hz.

Video display monitors such as computer displays have a line scan rate that is typically in a range from 30 kHz and 120 kHz. Since typical television signals have a line scan rate of approximately 16 kHz, video information from a television signal must be modified before it can be properly displayed on a video display monitor. Moreover, the present invention is arranged to adjust the sharpness of video images that are displayed on a video display monitor such that a selected video image is emphasized on the display.

FIG. 1 shows an example display system that is arranged in accordance with the present invention. The display system includes a display (100), a CPU (180), and an input device (not shown).

Display 100 contains a screen (110) upon which an image of a desktop windowed environment is displayed. A user may manipulate virtual objects depicted in the image with the input device. Exemplary input devices include a mouse, keyboard, touchscreen, voice-recognition system and the like. The desktop windowed environment may include a taskbar (120) and/or desktop icons (130) that are used to control and invoke various programs or system functions. The desktop environment may also include various windows such as a text window (140) and a television window (150). Display 100 also may include controls, (160) and/or a control window (170) that is arranged to accept commands from a user.

User-activated commands may be arranged to control various display parameters (e.g., brightness, contrast, focus, window size, etc.). CPU 180 may be arranged to interpret the user-activated commands, and control the display in accordance with the user-activated commands. In one example, television window 150 is resized by a user-activated command. In this example, CPU 180 is arranged to determine and change the display parameters in accordance with the size of the video image that is displayed in television window 150.

Text window 140 and television window 150 display different kinds of content. The parameters for sharpening that are suitable for television window 150 may be unsuitable for text window 140. Accordingly, the sharpness filter may be applied only to the video image within television window 150. The video image may be derived from a native format having line scans that are different from the line scan rate of screen 110. Displaying a video image within television window 150 typically results in the video image being displayed with higher line scan rates. A center frequency of the sharpness filter may be increased by an amount that is proportional to the ratio of the new scan rate to the original scan rate. (The sharpness filter center frequency typically lies midway between two frequency pass limits of a band-pass filter.) This increase maintains the same visual effect of the sharpness filter for a windowed video image as the effect on the original video image. For example, a line scan rate of an ordinary television may be 16 kHz, whereas the line scan rate of a windowed television signal may be 64 kHz, yielding a corresponding ratio of 4 to 1. Given that a sharpness filter center frequency of 3 MHz for an ordinary television signal, the sharpness filter center frequency for the windowed television signal should be centered around 12 MHz.

A video image within television window 150 may also be resized, which results in the video image having a different spatial frequency wherein the displayed objects in the resized video image are a different physical size. To maintain a same relative level of sharpness relative to the original video image, the sharpness filter center frequency is also adjusted according to the length (in pixels) of the original and resized windows. For example, a full-screen image that is adjusted so that its line length is half as long as the length of a full-screen image will have its spatial frequency doubled. Thus, the sharpness filter center frequency will be doubled to main the same relative level of sharpness.

Figure 2A:
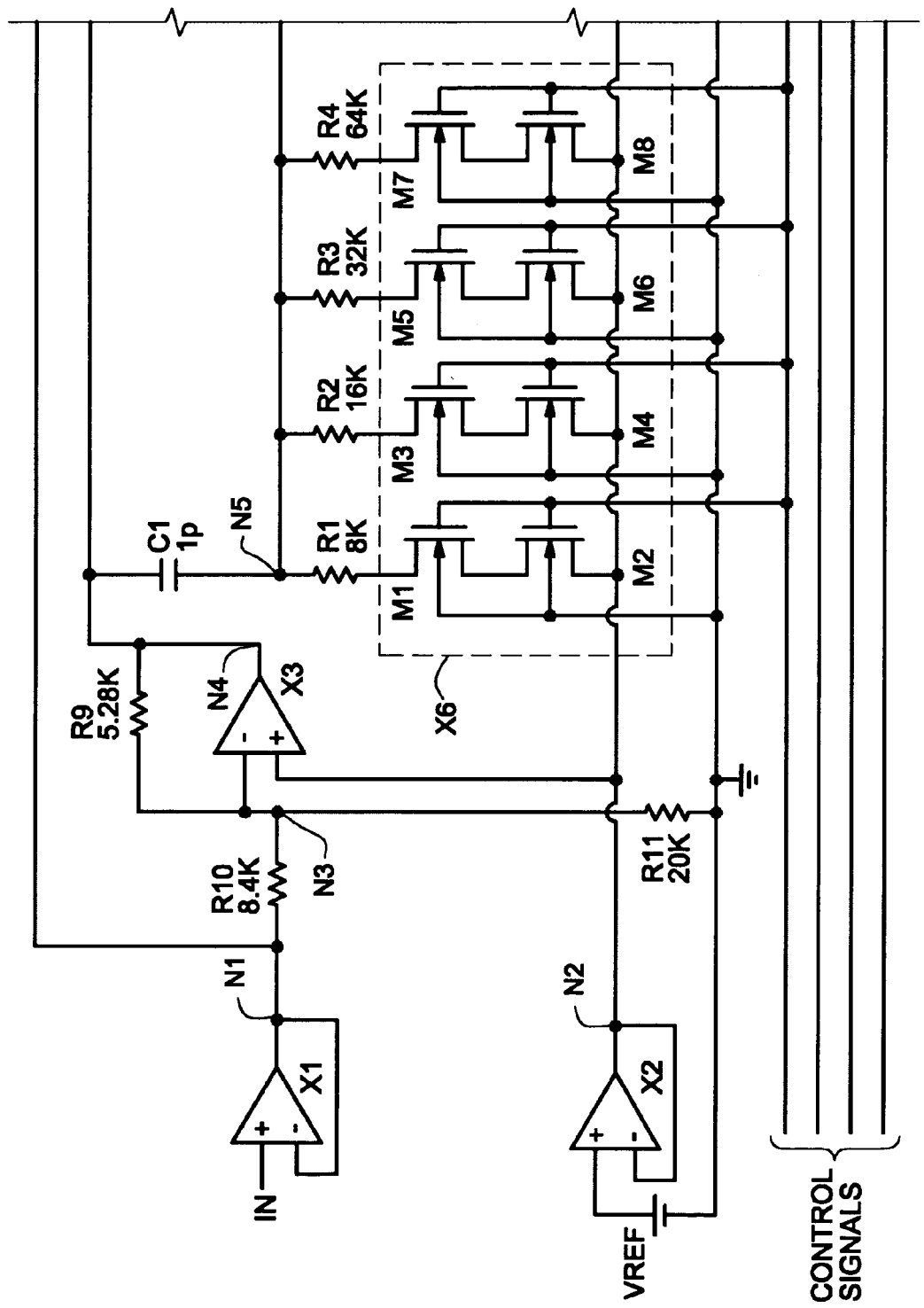
FIG. 2 shows an overview schematic of an example digitally controlled, variable frequency HF emphasis circuit in accordance with the present invention.
Figure 2B:
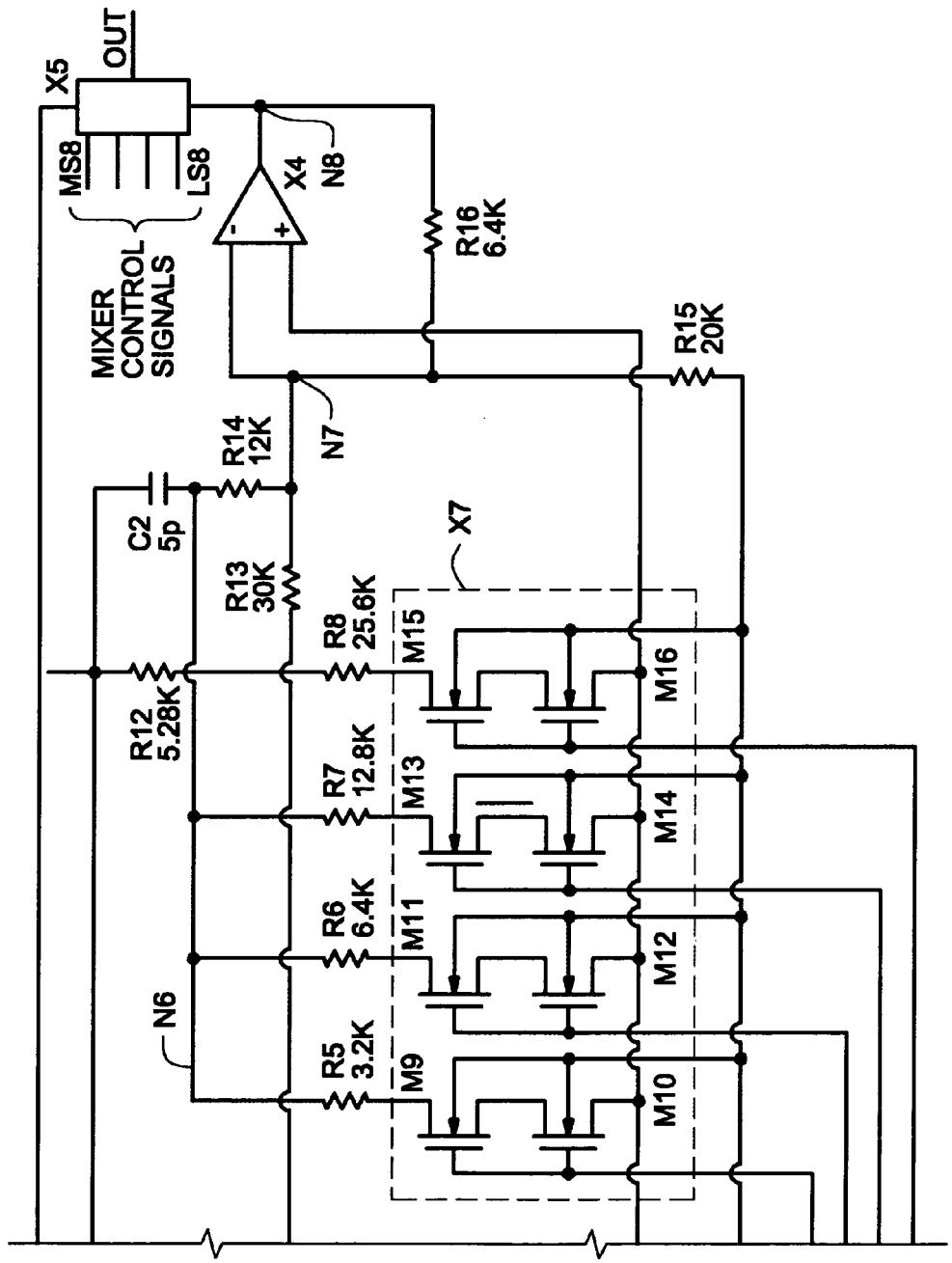

FIG. 2 shows an overview schematic of an example digitally controlled sharpness filter that is arranged in accordance with the present invention. The sharpness filter corresponds to a variable frequency HF emphasis circuit. As shown in the figure, sharpness filter 200 includes operational amplifiers X1–X4, digital attenuator X5, a first and a second programmable RC network, and resistors R9–R16.

The first programmable RC network comprises capacitor C1, resistors R1–R4, and switch matrix X6. Switch matrix X6 comprises transistors M1–M8. The second programmable RC network comprises capacitor C2, resistors R5–R8, and switch matrix X7. Switch matrix X7 comprises transistors M9–M16. Digital attenuator X5 is disclosed in U.S. Pat. No. 6,166,579 entitled "Digitally Controlled Signal Magnitude Control Circuit," which is incorporated herein by reference in its entirety. Digital attenuator X5 functions in a similar fashion to a tapped potentiometer, wherein a proportion of a combination of two signals can be selected. As illustrated in FIG. 1, switch matrices X6 and X7 are implemented in one embodiment as a series of stacked transistors, which helps to prevent reverse-biasing the body diodes of the transistors M1–M16. The switches may be implemented by any means that can selectively couple each of the resistors to the reference voltage present at node N2.

Input signal IN is a video input signal for which high frequency enhancement (i.e., sharpening) is desired. Operational amplifier X1 buffers input signal IN to drive node N1. Operational amplifier X2 buffers a voltage reference signal to drive node N2. The voltage present at node N2 represents the black level of the video signal and acts as a "ground displacement" circuit, which allows limited range operational amplifiers to be used for operational amplifiers X3 and X4. Operational amplifier X3 is configured to operate as a first inverting amplifier, where resistors R9 and R10 determine the gain of the first inverting amplifier from node N1 to node N4. Resistor R1 is arranged to lift the direct current operating level of the circuit to help keep signals within a limited range of the operational amplifiers. Node N4 is coupled to Node N7 through resistor R12. Operational amplifier X4 is configured to operate as a second inverting amplifier, where resistors R12 and R16 determine the gain of the inverting amplifier from node N4 to node N8. The gain of the second inverting amplifier is the inverse of the gain of the first inverting amplifier because the values of resistors R10 and R9 are transposed with respect to the values of resistors R12 and R16. The second inverting amplifier "rescales" the signal coupled through resistor R12 to its approximate original value before amplification. Resistors R13 and R14 respectively control the gain levels of the signals present at node N5 and node N6, respectively. Resistor R15 restores the direct current operating level to ground.

The first programmable RC network forms a first high pass filter that has a first RC time constant. The first RC time constant is determined by the product of the value associated with capacitor C1 and the effective resistance that is provided by resistors R1–R4. Resistors R1–R4 and transistors M1–M8 form a binary-weighted resistive network that is selectively controlled by control signals. A center frequency control register (not shown) is arranged to provide the control signals such that a first corner frequency that is associated with the first high pass filter may be adjusted. In one example, CPU 180 employs a value that is input from controls 160 or control window 170 to set the value of the center frequency via a control register. A first electrode of capacitor C1 is coupled to node N1, while a second electrode of capacitor C1 is coupled to node N5. Binary-weighted resistors R1–R4 each have a first electrode that is coupled to node N5. Each second electrode of resistors R1–R4 is coupled respectively to a pair of control transistors. The control transistor pair (e.g., transistors M1 and M2 for resistor R1) is arranged to selectively couple the second resistor electrode to node N2 in response to associated control signals.

The second programmable RC network forms a second high pass filter that has a second RC time constant. The second RC time constant is determined by the product of the value associated with capacitor C2 and the effective resistance that is provided by resistors R5–R8. Resistors R5–R8 and transistors M9–M16 form a binary-weighted resistive network that is selectively controlled by the control signals. The center frequency control register (not shown) is arranged to provide the control signals such that a second corner frequency that is associated with the second high pass filer may be adjusted. A first electrode of capacitor C2 is coupled to node N4 and a second electrode of capacitor C2 is coupled to node N6. Binary-weighted resistors R5–R8 each have a first electrode that is coupled to node N6. Each second electrode of resistors R5–R8 is coupled respectively to a pair of control transistors. The control transistor pair (e.g., transistors M9 and M10 for resistor R5) is arranged to selectively couple the second resistor electrode to node N2 in response to the associated control signals. Using the exemplary values that are illustrated in FIG. 2, the second RC time constant is twice as long as the first RC time constant throughout all possible values for the center frequency control register.

In operation, the first programmable RC network operates as a first order high pass filter. The first programmable RC network is arranged to high pass filter the buffered video input signal from node N1 and provide a first output signal at node N5. The second programmable RC network is also operates as a first order high pass filter and is arranged to high pass filter the inverted video input signal from node N4 and provide a second output signal at node N5. In one embodiment, the second programmable RC network has a frequency pass limit (i.e., the corner frequency of a high pass filter) that is lower than the frequency pass limit of the first programmable RC network by a factor of two. The outputs at nodes N5 and N6 of the first and second programmable RC networks (hereinafter referred to as "filter outputs") are combined at summing junction N7. Lower frequencies in the filter outputs that lie below the lower frequency pass limit tend to cancel out (because they exist in antiphase as described below) at summing junction N7.

As stated previously, operational amplifier X3 is configured to operate as a first inverting amplifier. The first output signal and the second output signal are 180 degrees out of phase with one another due to the arrangement of the first inverting amplifier. The lower frequencies in the filter outputs tend to cancel one another because the frequency components exist in antiphase (i.e., are inverted in polarity with respect to each other) in the time domain due to at the first inverting amplifier. Likewise, frequencies in the filter outputs that are higher than the frequency pass limit tend to cancel one another at summing junction N7 for the same reasons. Mid-range frequencies of the filter outputs (which lie between the higher and lower frequency pass limits) do not cancel one another and are instead emphasized when the outputs are summed at node N7. Thus, the first and second programmable RC networks are arranged to operate in similar fashion to a bandpass filter that has a center frequency that lies in a pass band that is defined between the first and second frequency pass limits.

The invention may also be used to de-emphasize frequency components that lie between the two pass limits by exchanging the pass limits of the two programmable RC networks. For example, frequency components that lie between the two pass limits can be de-emphasized by using a higher pass limit for the inverted video input (i.e., the signal at node N4) and a lower pass limit for the non-inverted video input signal (i.e., the signal at node N1).

Figure 3:
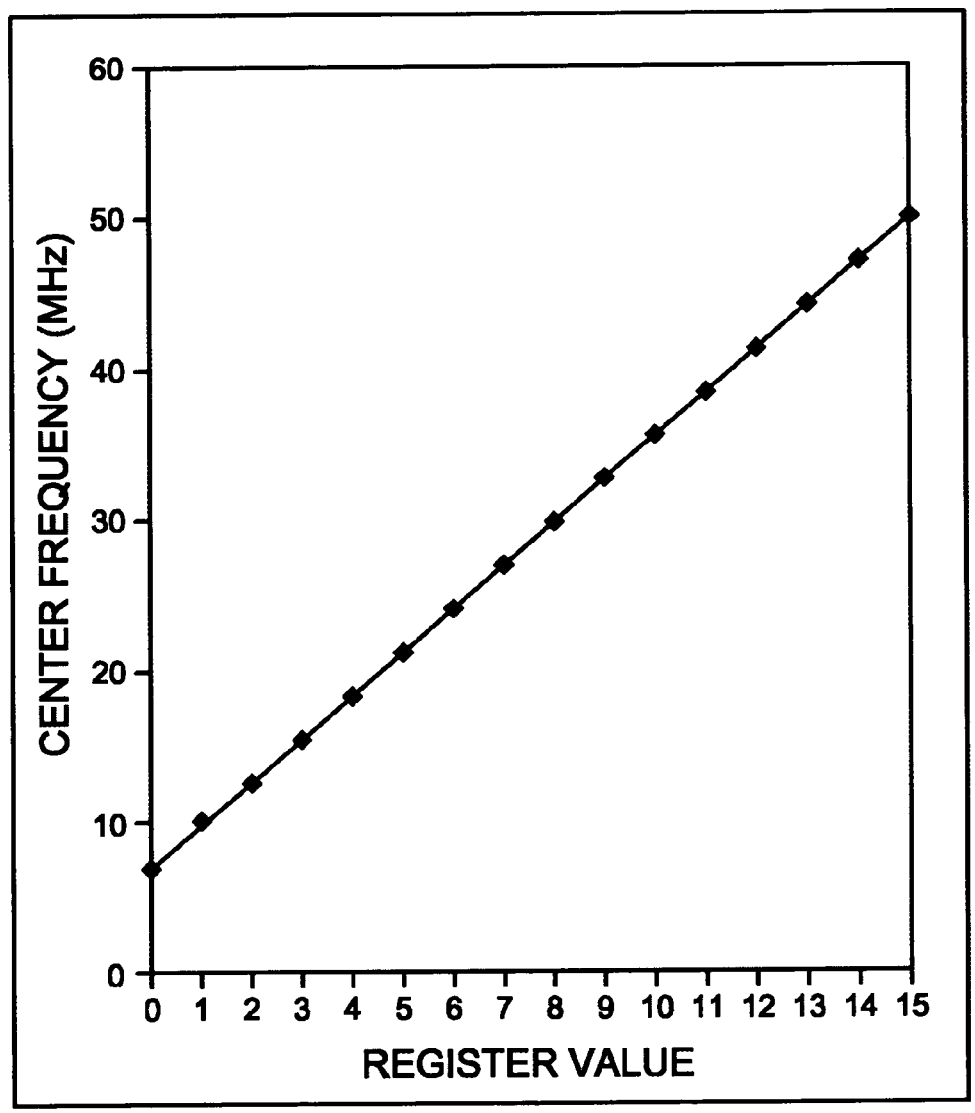
FIG. 3 is a graph showing the linear relationship between a center frequency control register value and the center frequency of an example sharpness filter used according to the present invention.

FIG. 3 is an exemplary graph that illustrates the linear relationship between a center frequency control register value and the center frequency of an example sharpness filter that is arranged in accordance with the present invention. The horizontal axis of the graph is indexed by decimal equivalent values for a control register having at least four bits. The vertical axis of the graph is indexed with center frequencies that are in the range from 0 MHz to 60 MHz, in 10 MHz steps.

An exemplary personal computer display has a line scan rate that is in a range between 30 kHz and 120 kHz, while an exemplary NTSC display has a line rate of 16 kHz. Sharpness filters for NTSC displays apply emphasis to the portion of the NTSC signal that is above the chroma subcarrier frequency (which is about 3.3 MHz). Accordingly, the sharpness filter of the present invention is capable of providing the same level of sharpening for a windowed video signal as that of sharpness filters for video images at normal television line rates. A change in the size of the video window on the display requires a change in the physical size of the objects of the video image.

The 16 center frequency steps illustrated in FIG. 3 are chosen so that an equivalent amount of emphasis may be applied to the signal for all specifies line rates and image sizes. In one example, the sharpness filter center frequency for a video image that has a line rate of 30 kHz and that occupies a full screen is set to 6.6 MHz by using a control register value of "0." In another example, a video image has a line scan rate of 120 kHz, the emphasis is applied at approximately 26 MHz (which has a corresponding control register value of "7") such that an equal amount of emphasis is applied to the video image when the scan rate is changed. When a television window (i.e., television window 150 from FIG. 1) is resized to half of its former width, the spatial frequency doubles. When the spatial frequency doubles, the center frequency that is necessary to apply the same emphasis should be centered at approximately 52 MHz (which has a corresponding control register value of "15").

Figure 4:
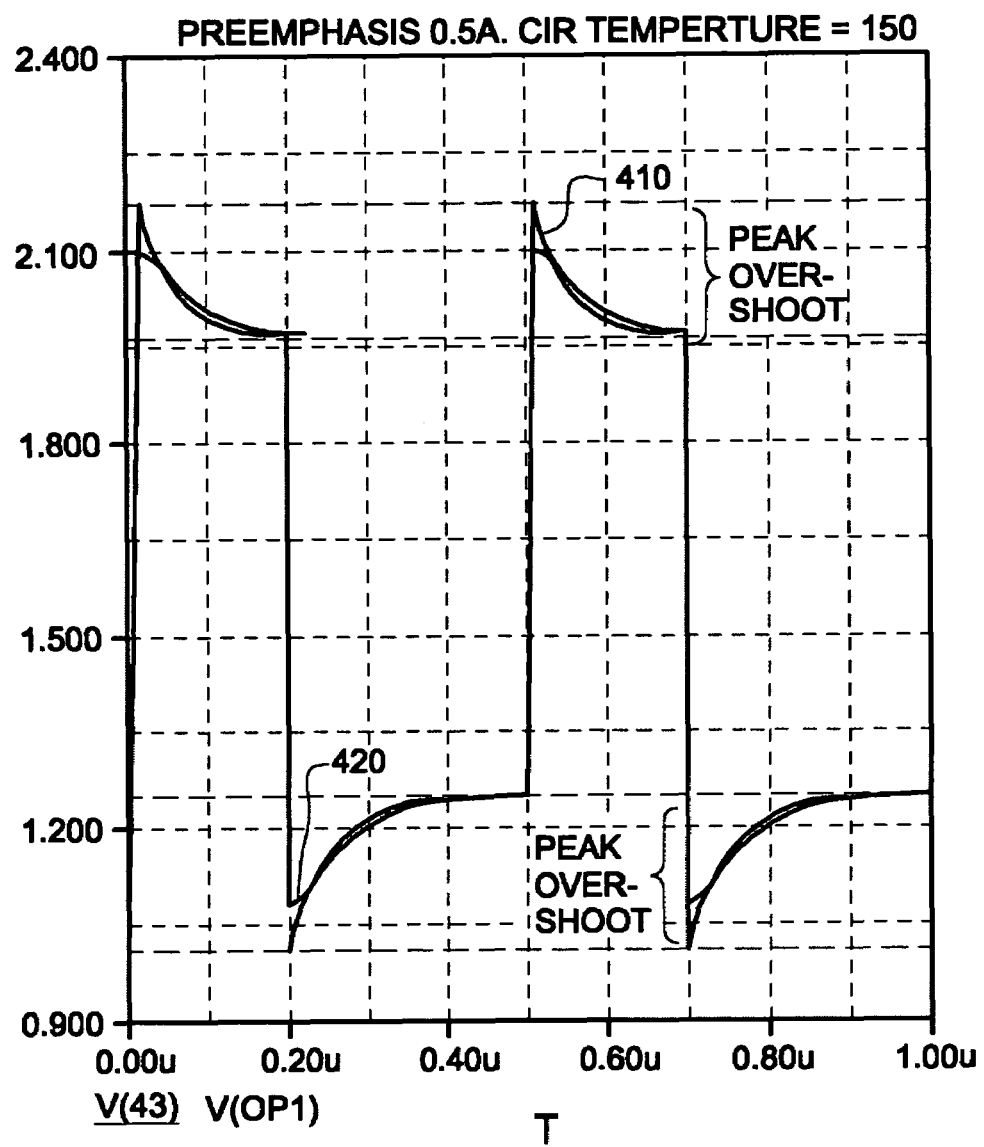
FIG. 4 is a graph showing the pulse response of a first order filter of an example sharpness filter according to the present invention.

FIG. 4 is a graph showing the pulse responses of a first order filter and an example sharpness filter that is arranged in accordance with the present invention. In FIG. 4, a pulse signal with a period of 0.5 μsec and a pulse width of 0.2 μsec is applied to the input of the first order filter and also applied to the input of the example sharpness filter (i.e., as input signal IN from FIG. 2).

The first order filter corresponds to a first order high pass filter that is formed by a series combination of a capacitor and a resistor (not shown). The capacitor has a value of 5 pF, while the resistor has a value of 12 kOhms. Trace 410 shows the pulse response of the first order high pass filter. The example sharpness filter corresponds to the sharpness filter that is illustrated in FIG. 2. The example sharpness filter is programmed via the center frequency control register to select a center frequency of 6.6 MHz. Trace 420 shows the pulse response of the example sharpness filter.

As illustrated in FIG. 4, the sharpness filter is arranged such that a greater proportion of higher order frequency components are filtered such that a peak overshoot for trace 420 is approximately 30 percent lower than the peak overshoot of trace 410. Both trace 410 and 420 have about the same amount of overshoot energy.

The response of an emphasis circuit for sharpening television signals should emphasize higher frequencies without causing excessive overshoot voltages in the peak of the signal. A simple high pass circuit results in high voltage peak levels as shown by trace 410. The high voltage peak levels may cause video driver circuits that receive the sharpness filter output to be overloaded. The sharpness filter according to the present invention combines two filter stages to condition the sharpness filter output as shown in trace 420.

Thus, the sharpness filter according to the present invention provides emphasis for higher frequencies while minimizing peak voltage excursions.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for providing an enhanced video image signal from a video input signal, comprising:
   inverting the video input signal to provide an inverted video input signal;
   coupling the video input signal to a first high pass filter, wherein the first high pass filter has a first pass band that is defined by a first corner frequency;
   providing a first filtered signal with the first high pass filter, wherein the first filtered signal is generated in response to the video input signal;
   coupling the inverted video input signal to a second high pass filter, wherein the second high pass filter has a second pass band that is defined by a second corner frequency that is different from the first corner frequency;
   providing a second filtered signal with the second high pass filter, wherein the second filtered signal is generated in response to the inverted video input signal; and
   combining the first and second filtered signals to produce a filtered video output signal, whereby an image produced by the filtered video output signal is sharpened.

2. The method of claim 1 wherein the first video input signal is encoded according to a video standard that corresponds to at least one of NTSC, PAL, and SECAM.

3. The method of claim 1 wherein the frequencies of the first and second pass limits are higher in frequency than the chrominance subcarrier frequency of the first video input signal.

4. The method of claim 1 wherein the second corner frequency is lower than the first corner frequency.

5. The method of claim 1 wherein the second corner frequency is lower than the first corner frequency by a factor of two.

6. The method of claim 1, further comprising: selecting the first corner frequency in response to a control code.

7. The method of claim 6, further comprising: selecting the second corner frequency in response to another control code, wherein the control code and the other control code are different from one another.

8. The method of claim 1, further comprising: selecting the second corner frequency in response to a control code.

9. The method of claim 1, further comprising: selecting the first corner frequency and the second corner frequency in response to a control code.

10. The method of claim 1, further comprising: combining the filtered video output signal with the video input signal to provide a video output signal.

11. The method of claim 10, wherein a first percentage of the filtered video output signal in the video output signal and a second percentage of the video input signal in the video output signal are specified by a mixer control code.

12. The method of claim 1, further comprising: displaying the filtered video output signal upon a display screen of a display monitor, wherein the video input signal is arranged for processing by a display device having a first line scan rate (scan1) that is different from another line scan rate (scan2) that is associated with the display monitor.

13. The method of claim 12, wherein the first corner frequency (fc1) is determined by fc1=fchroma*(scan1/scan2), wherein fchroma corresponds to a subcarrier frequency that is associated with the chrominance portion of the video input signal.

14. An apparatus for providing an enhanced video image signal from a video input signal, comprising:
   an inverting amplifier that is arranged to provide an inverted video input signal in response to the video input signal;
   a first high pass filter that is arranged to provide a first filtered signal in response to the video input signal, wherein the first high pass filter has a first RC time constant;
   a second high pass filter that is arranged to provide a second filtered signal in response to the inverted video input signal, wherein the second high pass filter has a second RC time constant; and
   a summing junction that is arranged to combine the first and second filtered signals to produce a filtered video output signal, whereby an image produced by the filtered video output signal is sharpened.

15. The apparatus of claim 14, wherein the second RC time constant is greater that the first RC time constant.

16. The apparatus of claim 14, wherein the second RC time constant is greater that the first RC time constant by a factor of two.

17. The apparatus of claim 14 wherein the first RC time constant is selected in response to a control signal.

18. The apparatus of claim 14, each of the first and second high pass filters further comprising: a programmable binary-weighted resistor network that is arranged to program a respective one of the first and second RC time constants in response to a corresponding control signal.

19. An apparatus for providing an enhanced video image signal from a video input signal, comprising:
   a means for inverting that is arranged to provide an inverted video input signal in response to the video input signal;
   a first means for high-pass filtering that is arranged to provide a first filtered signal in response to the video input signal, wherein the first means for high-pass filtering has a first pass band that is defined by a first corner frequency;
   a second means for high-pass filtering that is arranged to provide a second filtered signal in response to the inverted video input signal, wherein the second means for high-pass filtering has a second pass band that is defined by a second corner frequency; and
   a means for combining that is arranged to combine the first and second filtered signals to produce a filtered video output signal, whereby an image produced by the filtered video output signal is sharpened.

20. The apparatus of claim 19, further comprising a means for selecting that is arranged to select the first and second corner frequencies in response to a control code.

* * * * *

UNITED STATES PATENT AND TRADEMARK OFFICE
CERTIFICATE OF CORRECTION

PATENT NO. : 7,042,518 B1  
APPLICATION NO. : 10/135902  
DATED : May 9, 2006  
INVENTOR(S) : Andrew J. Morrish It is certified that error appears in the above-identified patent and that said Letters Patent is hereby corrected as shown below:

Column 4, Line 31, change "R1" to --R11--.

Column 8, Line 28, change "that" to --than--.

Signed and Sealed this

Fifth Day of September, 2006

JON W. DUDAS  
*Director of the United States Patent and Trademark Office*